June 28, 1955 M. A. MOSKOVITZ 2,711,919
SEALING UNIT
Filed June 22, 1951
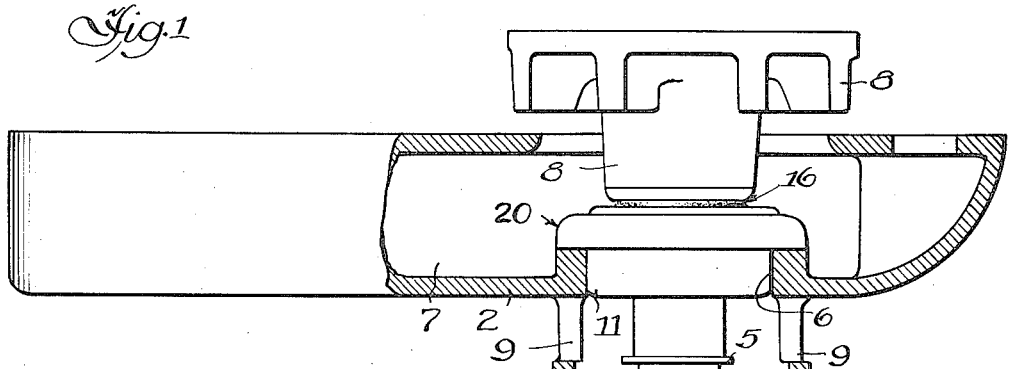
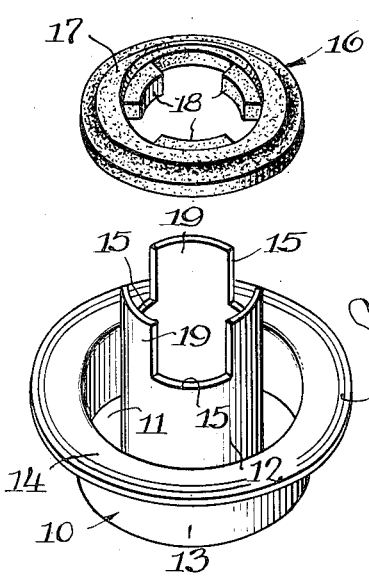
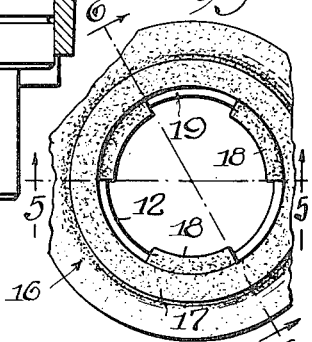
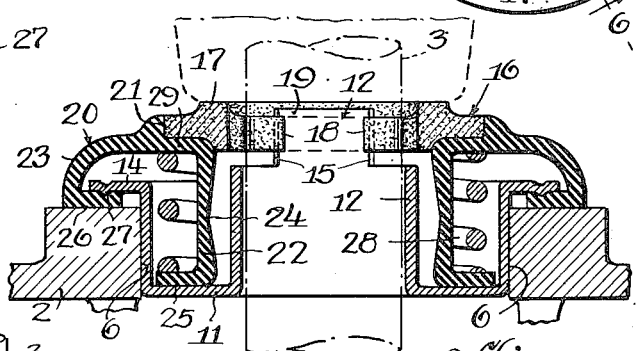
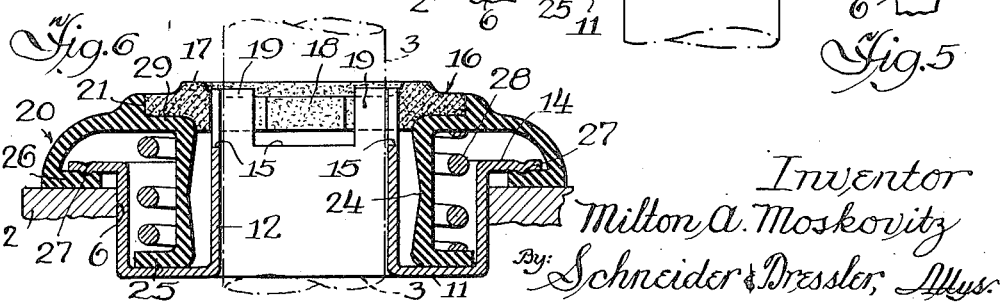
Inventor
Milton A. Moskovitz
By: Schneider & Dressler, Attys.

United States Patent Office 2,711,919
Patented June 28, 1955

2,711,919

SEALING UNIT

Milton A. Moskovitz, St. Louis, Mo., assignor of one-half to Harry Frankel, St. Louis, Mo.

Application June 22, 1951, Serial No. 233,029

10 Claims. (Cl. 288—2)

This invention relates to a sealing unit, and is particularly concerned with means for providing a fluidtight connection between a shaft rotating in a housing and the edges of an opening in the housing through which the shaft projects.

The sealing unit of the present invention is designed particularly for use with water pumps used for circulating water to cool internal combustion engines, such as automobile engines, but may be used in any suitable environment. The sealing unit is a cartridge type seal comprising a double-walled metal cup having a flange on one end, a rubber gland, a sealing gasket or washer, and a spring, assembled as a unit that may be readily replaced with a minimum of labor and expense. One end of one wall of the metal cup is notched, and the sealing washer has a plurality of integral lugs interengaged with the notches of the cup wall to prevent relative rotation between the gasket and the cup. One end of the rubber gland terminates in an annular flange which is extended under the flange of the metal cup to form a fluid tight seal between the flange of the cup and the housing in which the shaft is mounted. The inner wall of the rubber gland is reduced in cross sectional area adjacent its medial portion to make it flexible. This flexibility facilitates assembly of the sealing unit by allowing the inner wall of the rubber gland to be collapsed. The flexibility of the rubber gland also permits the spring, which bears against opposite wall portions of the gland, to exert a constant force urging the sealing washer into contact with the adjacent surface of the impeller, thereby maintaining a fluid tight engagement between the washer and the impeller as the washer wears down. The outer wall of the rubber gland seals the space between the outer edge of the sealing washer and the flange on the metal cup, thereby protecting the spring from corrosive action of water or anti-freeze solution that is contained in the fluid chamber. If the outer wall of the rubber gland becomes torn or rotted, the inner wall continues to afford protection against leakage of the water to the shaft until the sealing unit can be replaced.

The structure by means of which the above and other advantages of the invention are attained will be described in detail in the following specification, taken in conjunction with the accompanying drawing, showing a preferred illustrative embodiment of the invention, in which:

Figure 1 is a view, partly in section and partly in elevation, showing a water pump with the sealing unit, which constitutes the present invention, assembled therewith;

Fig. 2 is a perspective view of the sealing washer;

Fig. 3 is a perspective view of the double-walled metal cup;

Fig. 4 is a fragmentary top elevational view of the sealing unit applied to a water pump;

Fig. 5 is a cross sectional view, taken along the line 5—5 of Fig. 4; and

Fig. 6 is a cross sectional view, taken along the line 6—6 of Fig. 4.

In the drawings, the reference numeral 2 indicates a water pump housing in which a shaft 3 is rotatably mounted. Shaft 3 is provided with a conventional bearing 4 and slinger plate 5 and projects through an opening 6 in the water pump housing, which opens into a fluid chamber 7. An impeller 8, mounted on the end of shaft 3 in the fluid chamber, rotates with the shaft to circulate fluid throughout the fluid chamber. The purpose of the sealing unit is to permit rotation of shaft 3 without permitting water or other fluid from passing through opening 6 to bearing 4. The construction of the sealing unit and its arrangement with respect to opening 6 are such that leakage past the opening is prevented even where the opening is "out-of-round" or the walls defining the opening are scored. If a small amount of fluid leaks through opening 6 it is thrown out through apertures 9 in the shaft housing by slinger plate 5 before it reaches the bearing.

The sealing unit comprises a metal cup 10 having a bottom 11, an inner wall 12 and an outer wall 13 which is parallel to wall 12. Outer wall 13 terminates in an outwardly extending circumferential flange 14. The cup 10 may be made of any suitable metal, but is preferably made of brass because it may be drawn easily and will not corrode. The free end of inner wall 12 is notched, as indicated at 15, for a purpose hereinafter disclosed.

An annular sealing gasket 16, preferably of carbon-graphite composition, has one face 17 smooth for sealing contact with one end of impeller 8. The inner circumference of gasket 16 is provided with integral lugs 18 extending inwardly thereof which interengage notches 15 to prevent relative rotation between gasket 16 and cup 10. Lugs 18 are of a width substantially equal to the width of notches 15 to prevent excessive side movement or chatter. It will be obvious any number of interengaging lugs 18 and notches 15 may be provided, but it is preferred to use three so that the portions 19 of inner wall 12 intervening between notches 15 are of substantial width.

A rubber gland 20 has one wall portion recessed, as indicated at 21, to provide an intimate fit with the outer circumference of gasket 16. Gasket 16 and rubber gland 20 are molded or pressed together to the assembled position shown in Figs. 5 and 6. The rubber gland comprises an inner cylindrical wall 22 which encircles inner wall 12 of cup 10 and an outer wall 23. Wall 22 is reduced in cross sectional area adjacent its medial portion, as indicated at 24, to facilitate longitudinal collapse of the gland in order to facilitate assembly of the sealing unit and for wear take up on sealing gasket 16 as it occurs. One end 25 of wall 22 seats against bottom wall 11 of cup 10 in the assembled unit. Outer wall 23 extends outwardly from the outer periphery of gasket 16 and terminates in an inwardly extending flange 26 which fits between flange 14 and housing 2 to form a fluidtight seal therebetween. Flange 14 may be indented, as indicated at 27, to strengthen the bond between it and flange 26 of the rubber gland.

A coiled compression spring 28 encircles inner wall 22 of gland 20. Spring 28 extends vertically in the space between wall 22 and outer wall 13 of cup 10. One end of spring 28 bears against the wall portion 29 of the gland underlying gasket 16, and the other end bears against end 25 of the gland and bottom wall 11 of cup 10. Spring 28 exerts a constant force urging gasket 16 away from bottom wall 11 and into sealing contact with impeller 8. As the face of gasket 16 becomes worn down by its contact with the rotating impeller, spring 28 compensates for the wear and maintains the sealing engagement between the face 17 of the gasket and the bottom of impeller 8. Rubber gland 20 is sufficiently flexible to allow the expansion of spring 28 necessary to maintain gasket 16 in sealing engagement with impeller 8.

Metal cup 10 is drive-fitted into opening 6 with spring 28 enclosed by gland 20. The pressure used to drive the unit into position is applied through gland wall 23 against flange 14, aided by pressure on the top edge of inner wall 12. This method is possible because of the longitudinal collapse of inner gland wall 22 due to its reduced cross sectional area at 24. The pressure is applied all around the circumference of the cup to divide the assembly pressure and insure a fluidtight seal between flange 26 and housing 2. As soon as the metal cup is properly seated and pressure is removed from flange 14, spring 28 will move wall portion 29 of gland 20 and gasket 16 into sealing engagement with impeller 8.

Outer wall 23, in addition to protecting spring 28 from the corrosive action of water or anti-freeze solution that may be contained in fluid chamber 7, provides added sealing protection for bearing 4 because it prevents water from coming into contact with inner wall 22, and thereby prevents tearing or rotting of wall 22. With the breakdown of rubber walls 23 and 22, the seal, of course, fails.

Although I have described a preferred embodiment of my invention in considerable detail, it will be understood that the description thereof is intended to be illustrative, rather than restrictive, as many details may be modified or changed without departing from the spirit or scope of the invention. Accordingly, I do not desire to be restricted to the exact structure described.

I claim:

1. A sealing unit for placement in an opening of a liquid-retaining housing and through which opening a rotary shaft extends; said unit comprising a double-walled metal cup having inner and outer annular walls connected by a bottom radial wall adapted to be fixed firmly in said opening to encircle said shaft, a spring between the said inner and outer walls of said cup, a rubber gland having an end wall and a pair of radially spaced annular walls, one of said annular gland walls extending between said spring and inner cup wall and the other annular gland wall extending about the spring exterior and sealingly engaging said outer cup wall, a sealing gasket fitted to said gland end wall and extending toward said inner cup wall, and means on said inner cup wall and gasket to interlock them against relative rotation.

2. A sealing unit for placement in an opening through a liquid-retaining housing, there being a shaft projecting through said opening; said unit comprising a double-walled metal cup having inner and outer annular walls connected by a bottom radial wall adapted to be secured in said opening to encircle said shaft, resilient means between said cup walls, a double-walled rubber gland having inner and outer radially spaced walls connected by a radial end wall, and one of said radially spaced walls arranged between said resilient means and inner cup wall and its other wall extending about said resilient means and sealingly engaging said outer cup wall, a sealing gasket carried on said gland and positioned between said inner gland wall and inner cup wall, and means between said gasket and inner cup wall to interlock them against relative rotation, said resilient means urging said cup and gasket in opposite directions.

3. The mechanism described in claim 2, but further characterized in that said interlocking means consists of slots through said inner cup wall and gasket portions extending radially inwardly through and beyond said slots.

4. A sealing unit for positioning in the opening of a housing that retains liquid and having a shaft extended through said opening; said unit comprising a metal cup having inner and outer radially spaced walls connected at one end by a bottom radial wall and adapted to be secured firmly in said opening to closely encircle said shaft, a coil spring between said inner and outer walls, a rubber gland having radially spaced inner and outer walls connected at one end by a radial end wall, said inner gland wall being within said spring and said outer gland wall being arranged exteriorly about said spring and the outer wall of said cup and sealingly engaging said cup outer wall, and a gasket between said inner gland wall and inner cup wall, and interlocking means between said gasket and inner cup wall to prevent relative rotation therebetween.

5. A sealing unit adapted to be placed in an opening of a liquid-retaining housing through which a rotary shaft projects, to seal against liquid passage between said shaft and opening; said unit comprising a metal cup with radially spaced inner and outer walls interconnected at one end to provide a bottom wall, said outer wall having an outwardly directed radial flange adapted to overlie said opening, a rubber gland having a pair of radially spaced inner and outer walls interconnected at one end to provide an end wall, the outer wall of said gland provided with a radially inwardly directed flange to fit and seal against said radial cup flange, a coil spring coaxially within said gland and pressing in opposite directions toward said end wall of the gland and the bottom wall of the cup, the gasket between the inner wall of said gland and inner cup wall, and means interlocking said gasket with the inner cup wall against relative rotation.

6. A sealing unit adapted to be placed in the opening of a liquid-retaining housing through which a rotary shaft projects, to seal against liquid leakage between said shaft and opening; said unit comprising a tubular metal cup provided with concentric radially spaced inner and outer peripheral walls extending in the same direction toward their terminal ends and interconnected at their other ends by a bottom wall, said outer wall having a radially outwardly directed flange adapted to overlie said opening, a tubular rubber gland having a pair of concentric radially spaced inner and outer peripheral walls interconnected at one end by an end wall, the terminal ends of said peripheral walls of said cup and gland extending in mutually opposite directions, and the bottom cup wall and the end wall of said gland being spaced axially, the outer wall of said gland provided with a radially inwardly directed flange to sealingly engage said radially outwardly directed cup flange, a coil spring coaxially within said gland and pressing said end wall of the gland and the bottom wall of said cup in mutually opposite directions, a gasket between said end wall of said gland and the inner wall of said cup, and means interlocking said gasket and the inner cup wall against relative rotation.

7. A sealing unit adapted to be placed in an opening of a liquid-retaining housing through which a rotary shaft projects to seal against liquid passage between said shaft and opening; said unit comprising a metal cup adapted to be fixed in said opening and provided with radially spaced inner and outer peripheral walls interconnected at one end to form a bottom wall, said outer wall having a radially outwardly directed flange adapted to overlie said opening, a rubber gland having a pair of radially spaced inner and outer walls interconnected at one end to form an end wall, said gland end wall and said cup bottom wall being axially spaced, said gland outer wall provided with a radially inwardly directed flange to fit and seal against said cup flange of the outer wall, and the inner wall of said gland provided with a radially outwardly directed flange to seat on said cup bottom wall, a coil spring coaxially within said gland and pressing in opposite directions against said gland end wall and said outwardly directed gland flange, a gasket between the inner wall of said gland and inner cup wall, and means interlocking said gasket and inner cup wall against relative rotation.

8. A sealing unit adapted to be sealingly inserted in an opening through a liquid-retaining housing with an impeller therein that is driven by a shaft that projects axially through said opening; said unit comprising a metal cup having an imperforate bottom wall and a pair of axially extending concentrically spaced inner and outer annular walls, said outer wall having a radially outwardly directed flange, a rubber gland having a pair of radially spaced inner and outer annular walls interconnected at one end only by an imperforate end wall, said outer gland wall terminating in a radially inwardly directed flange engaging said radially outwardly directed cup flange, the end of said inner gland wall having a radially outwardly directed flange engaging the cup bottom wall, a gasket sealingly mounted on said gland end wall and extending therefrom toward said inner cup wall, means between said gasket and inner cup wall to interlock said gasket and cup against relative rotation, and a coil spring between both annular gland walls and bearing against the gland end wall and the outwardly directed gland flange to urge said gasket axially in one direction and urge said outwardly directed gland flange into sealing engagement with the cup and bottom wall.

9. In a sealing unit for positioning in the opening of a housing through which a rotary shaft projects; said unit comprising a metal cup having a bottom wall and a pair of concentrically spaced inner and outer annular walls adapted to be positioned so that said inner wall encircles said shaft and said outer wall extends within said opening, a rubber gland having an imperforate end wall and a pair of concentrically spaced inner and outer annular walls depending therefrom, said inner gland wall extending downwardly between said concentric cup walls and having a radially outwardly directed flange seating on said cup bottom wall, said outer gland wall provided with a flange sealingly engaging the outer cup wall, resilient means between said inner gland wall and outer cup wall and forcibly bearing against said radially outwardly directed flange of the inner wall of the gland and the end wall of the gland, a gasket carried on said gland and positioned between said inner gland wall and said inner cup wall, and means interlocking said gasket and inner cup wall to prevent relative rotation of said gasket and cup.

10. In a sealing unit for positioning in an opening of a housing through which a rotary shaft extends, and there being an annular space between said shaft and the bounding wall of the opening; a metal cup having a bottom wall and a pair of concentrically spaced inner and outer annular walls that are adapted to be positioned to encircle said shaft so that the inner wall is relatively close to said shaft and the outer wall is spaced radially outwardly therefrom and seals against said opening bounding wall to substantially close said annular space, a rubber gland having an imperforate end wall and a pair of concentrically spaced inner and outer annular walls depending therefrom, said inner gland wall extending between the concentric bounding walls of said cup and having a radially outwardly directed flange seating against said cup bottom wall, resilient means engaging between said cup and gland and exerting pressure therebetween to seal the radially outward flange of the inner gland wall against the cup bottom wall, the upper end of the inner cup wall terminating above the corresponding end of its outer wall, a gasket carried on said gland and positioned between said inner gland wall and said inner cup wall, and means between the said upper end of the inner cup wall and the gasket for interlocking said cup and gasket thereat to prevent relative rotation therebetween.

References Cited in the file of this patent

UNITED STATES PATENTS

| | | |
|---|---|---|
| 1,897,280 | Schwitzer et al. | Feb. 14, 1933 |
| 2,339,099 | Namur | Jan. 11, 1944 |
| 2,444,699 | Hastings et al. | July 6, 1948 |
| 2,474,123 | Schmitz | June 21, 1949 |
| 2,497,704 | Voytech | Feb. 14, 1950 |
| 2,499,353 | Brammer | Mar. 7, 1950 |
| 2,542,902 | Chubbuck | Feb. 20, 1951 |
| 2,572,422 | Agger | Oct. 23, 1951 |
| 2,583,867 | Meyer | Jan. 29, 1952 |
| 2,610,075 | Haake | Sept. 9, 1952 |

FOREIGN PATENTS

| | | |
|---|---|---|
| 963,942 | France | Jan. 18, 1950 |